Nov. 14, 1967   W. G. ANDERSON   3,352,053
FOLDABLE RODENTICIDE FEEDING BOX AND BLANK THEREFOR
Filed March 28, 1966   3 Sheets-Sheet 1
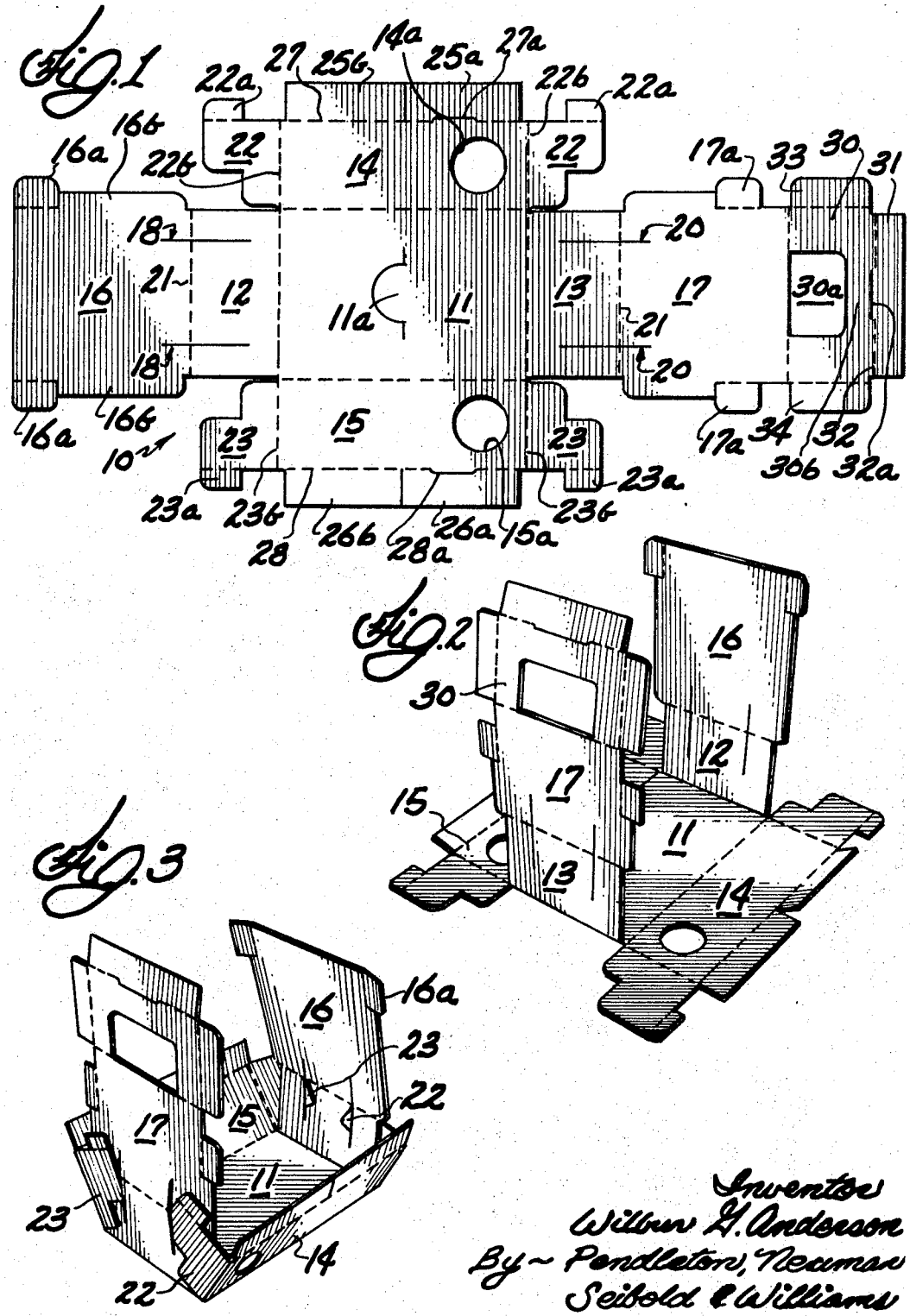
Inventor
Wilbur G. Anderson
By ~ Pendleton, Neuman
Seibold & Williams
Attorneys

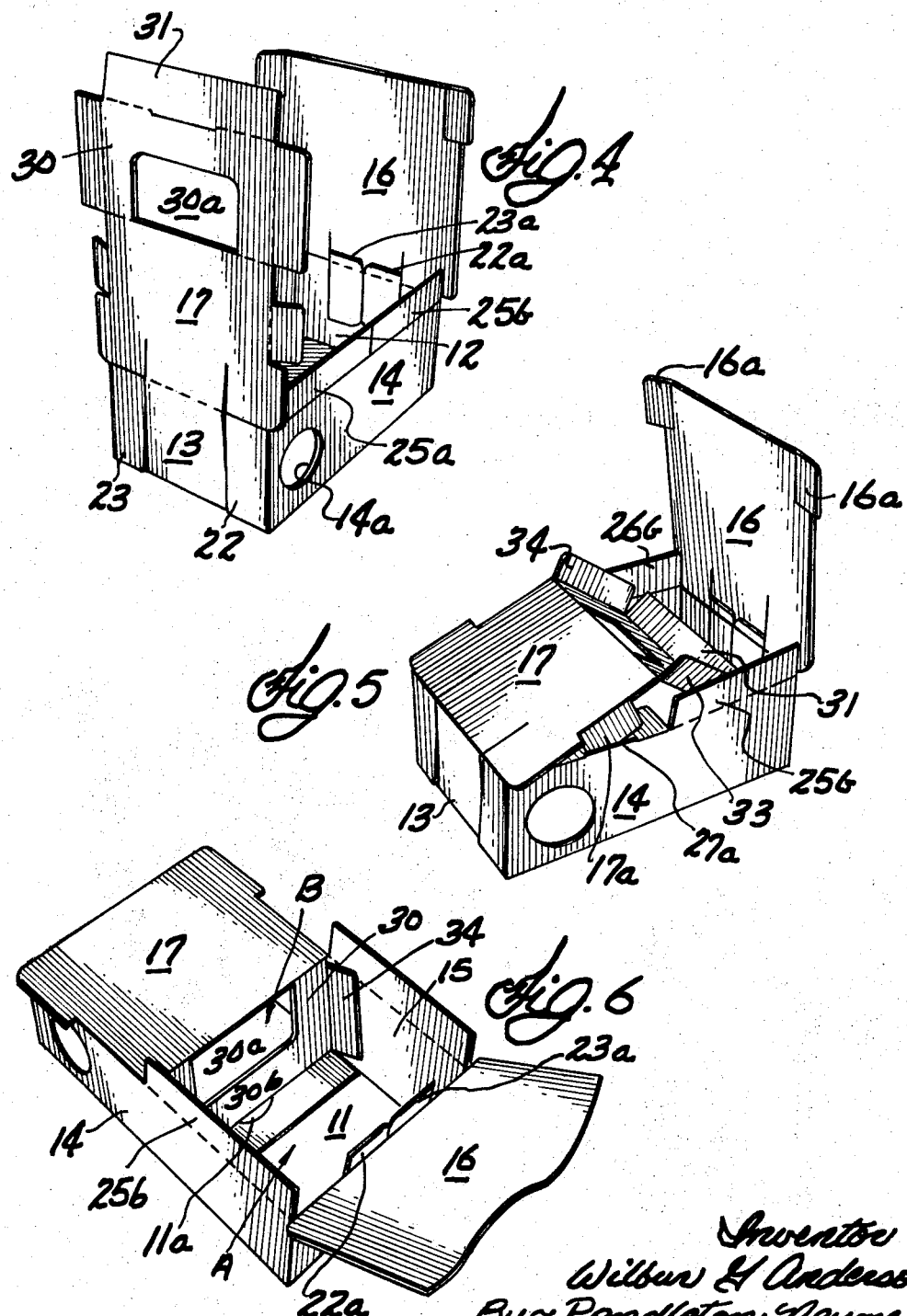

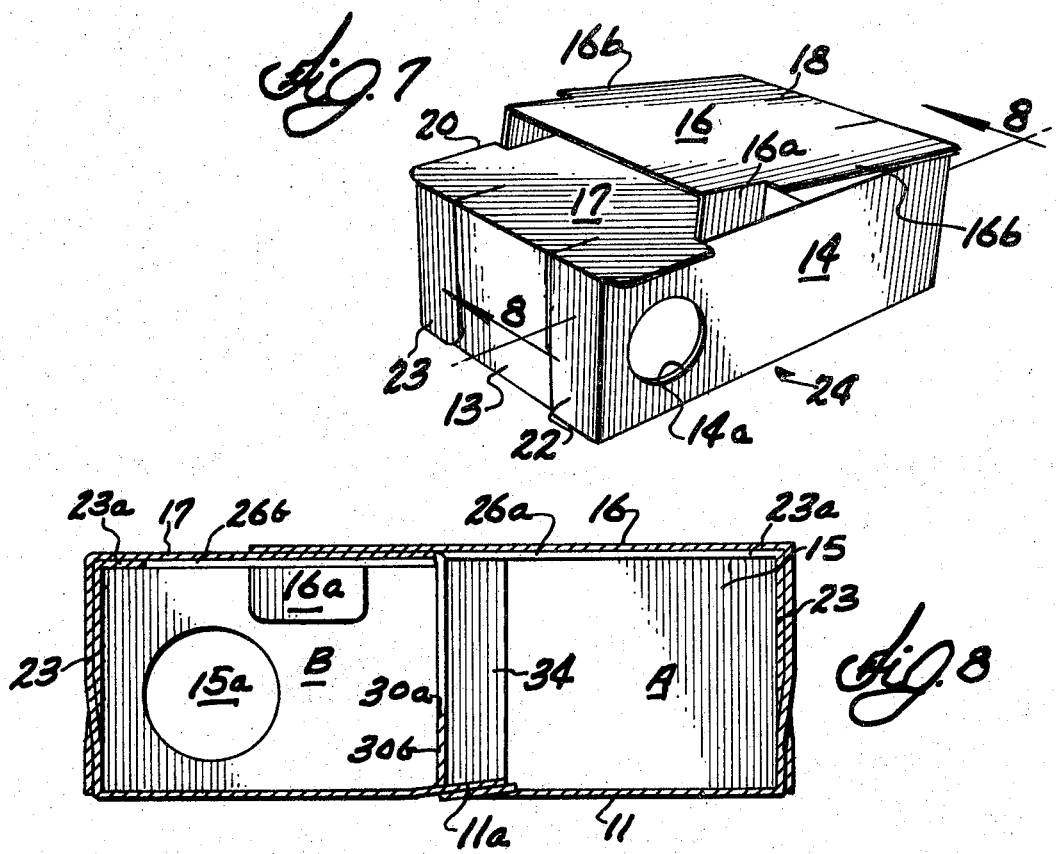

United States Patent Office 3,352,053
Patented Nov. 14, 1967

3,352,053
FOLDABLE RODENTICIDE FEEDING BOX AND BLANK THEREFOR
Wilbur G. Anderson, Grand Rapids, Mich., assignor to Packaging Corporation of America, Evanston, Ill., a corporation of Delaware
Filed Mar. 28, 1966, Ser. No. 538,014
16 Claims. (Cl. 43—131)

This invention relates to a box construction and blank therefor and more particularly to a folding box suitable for use as a bait box for catching rodents and other similar type animals.

Various boxes, sometimes referred to as traps, have heretofore been provided; however, because of certain design characteristics they are of a bulky, costly construction, are flimsy and lack stability, and/or are incapable of being collapsed for storage or transporting in quantity. Furthermore, with the prior structures it was oftentimes difficult and awkward to remove the trapped animal or replenish the bait contained within the box.

Thus, it is one of the objects of this invention to provide a box construction which is not beset with the aforementioned shortcomings associated with the prior art structures.

It is a further object of this invention to provide a box which is of simple design and may be readily set up at the time of use.

It is a still further object of this invention to provide a box which is of inexpensive construction and is effective in operation.

Further and additional objects will appear from the description, accompanying drawings, and appended claims.

In accordance with one embodiment of this invention a box, formed of paperboard material, is provided having a bottom panel, upright side panels delimiting said bottom panel, and a sectional cover having one section thereof foldably connected to one side panel and a second section foldably connected to an opposite side panel. At least one of the side panels is provided with an animal opening for access to the box interior. Foldably connected to one of the cover sections is an apertured partition panel which is adapted to be disposed within the box interior and effect compartmenting thereof. The partition panel has the lower edge portion thereof in interlocking engagement with the bottom panel. The aperture formed in the partition panel is of sufficient size to permit an animal to pass therethrough.

For a more complete understanding of this invention reference should be made to the drawings wherein:

FIGURE 1 is a plan view of the blank for one form of the improved box construction;

FIGS. 2–7 are perspective views of the box construction shown in successive steps of erection.

FIG. 8 is an enlarged sectional view taken along line 8—8 of FIG. 7.

Referring now to the drawings and more particularly to FIG. 1, a blank 10 is shown which is formed of relatively stiff sheet material, such as paperboard, which has been treated so as to be highly moisture-resistant. The character of the sheet material employed in forming the blank will depend upon the use for which the box is intended. Furthermore, the shape and size of the box may vary from that shown without departing from the scope of the invention.

Blank 10 includes a bottom panel 11 generally of rectangular shape, end wall panels 12 and 13 foldably connected to opposed narrow side edges of panel 11 and side wall panels 14 and 15 foldably connected to the opposed long side edges of panel 11. Foldably connected to the outer edge of panel 12 is a first cover section 16.

In a like manner a second cover section 17 is foldably connected to the outer edge of panel 13. Each panel-cover section combination 12–16 and 13–17 is provided with a pair of elongated slits 18 and 20, respectively. The slits of each pair are arranged in spaced substantially parallel relation with respect to one another and are disposed substantially normal to the foldline 21 connecting the cover sections to the respective end wall panel. A greater segment of each slit is disposed within the end wall panel 12 or 13.

Laterally extending and foldably connected to the opposite ends of each side wall panel 14 or 15 are locking flaps 22 and 23. The outer edge portion of each flap is provided with a foldable tab 22a or 23a. The axis of fold of each tab is normal to the respective foldline 22b or 23b connecting the flap to the end of the corresponding side wall panel.

When the blank 10 is set up to form the improved box 24, see FIG. 7, the flaps 22 and 23 are adapted to be inserted through the slits 18 and 20 and interlockingly engage therewith so as to form a traylike unit, see FIGS. 3 and 4.

Foldably connected to the outer elongated edge of each side wall panel 14 and 15 are narrow extension flaps 25a–b and 26a–b, respectively. The foldline connections 27 and 28 between the extension flaps and the respective side wall panels 14 and 15 are each interrupted by a slot 27a or 28a. The function of flaps 25a–b and 26a–b will become apparent hereinafter, when the steps of erecting the box are described more fully.

As noted in FIG. 1, a partition panel 30 is foldably connected to the outer edge of cover section 17. Panel 30, in turn, has foldably connected to the outer edge thereof a flap 31 which is adapted to engage the bottom panel 11 when the box is erected. The foldline connection 32 between panel 30 and flap 31 is provided with a centrally disposed slot 32a. Slot 32a is adapted, when the box is set up, to accommodate a tongue 11a, which is formed substantially centrally of panel 11.

Foldably connected to the opposed narrow edges of panel 30 are laterally extending shoulder flaps 33 and 34 which are adapted to frictionally engage the interior surfaces of the side wall panels 14 and 15, respectively, when the box is erected.

Panel 30, as seen in FIG. 1, is provided with a large opening 30a which is of a suitable size to permit a small animal to pass therethrough. When the box is set up, panel 30 will be vertically disposed with respect to panel 11 and effect compartmenting of the box interior into compartments A and B, see FIG. 6. The size and shape of opening 30a is such that a ledge-like portion 30b is formed in the panel 30 over which an animal is required to step before reaching the bait disposed within compartment A. Portion 30b serves the purpose of making it extremely difficult for an animal to drag the bait out of the box. To gain access to the bait disposed within the box, an animal is required to initially pass through one of the openings 14a or 15a formed in side wall panels 14 and 15, respectively, into compartment B, and then through partition panel opening 30a into compartment A.

Foldably connected to and laterally extending from cover section panels 16 and 17 are pairs of tongues 16a and 17a, respectively, see FIG. 1. The tongues are adapted to be inserted into the respective slots 27a and 28a, formed in the foldline connections 27 and 28 for the side wall panels 14 and 15, when the cover sections are in closed positions and thus frictionally retain such cover sections in such positions.

As noted in FIGS. 7 and 8 cover section 16 is adapted to partially overlap cover section 17, when the cover sections are disposed in closed positions and thus protect the box interior against rain or dirt. Upon sections 16 and 17 being folded to closed positions, tabs 22a and 23a carried by flaps 22 and 23, respectively, are also folded by the cover sections and thereby effect interlocking of the flaps and end wall panels 12 and 13. Extension flaps 25a–b and 26a–b connected to side wall panels 14 and 15, respectively, are folded inwardly at substantially right angles with respect to panels 14 and 15 and are retained in such folded positions by the closed cover sections 16 and 17. Folded extension flaps 25b and 26b are adapted to overlie the shoulder flaps 33 and 34, respectively, carried by partition panel 30, when the box is erected and thus hold the panel 30 in its vertical position with respect to bottom panel 11.

Extension flaps, when folded inwardly toward one another, engage one surface of erected partition panel 30 and prevent the latter from being pushed inwardly toward end panel 12 by a small animal and cause tongue 11a to become disengaged from slot 32a.

In addition to the foregoing recited functions of the extension flaps, the latter tend to prevent water and dirt from finding their way into the box interior. Cover section 16 has opposed marginal portions 16b which are adapted to overhang the erected side panels 14 and 15, when section 16 is in its closed position.

In setting up the box, the end panels 12 and 13 are initially folded so as to assume vertical positions, as shown in FIG. 2. The cover sections 16 and 17 and the flaps associated therewith are simultaneously moved to the vertical positions with the respective end panels 12 and 13. With the end panels 12 and 13 and cover sections 16 and 17 disposed in vertical positions, the side panels 14 and 15 are then moved to upright positions. Simultaneous with the moving of the side panels to vertical positions, the locking flaps 22 and 23 are folded inwardly into overlapping relation with end panels 12 and 13, whereby the flaps are inserted through elongated slits 18 and 20, see FIG. 3.

Upon the end and side wall panels assuming their upright positions, see FIG. 4, cover section 17 carrying partition panel 30 therewith is then folded downwardly into overlying relation with the upright end and side wall panels, see FIG. 5.

Prior to section 17 reaching its closed position, partition panel 30 is folded downwardly relative to section 17, so that panel 30 assumes a vertical position, see FIG. 6. When panel 30 is in its vertical position, shoulder flaps 33 and 34 engage and are in surface-to-surface contact with the interior surfaces of side wall panels 14 and 15, respectively. In a like manner flap 31 is disposed in surface-to-surface contact with the interior surface of bottom panel 11. As the flap 31 moves into contact with panel 11, the tongue 11a is caused to be inserted through slot 32a.

It will be noted in FIG. 5 that tongues or tabs 17a connected to cover section 17 are folded downwardly and inserted into respective slots 27a and 28a. Tongues or tabs 16a, carried by cover section 16, are folded downwardly relative to section 16 and are inserted into the respective slots 27a and 28a. Tabs 16a, when in slots 27a and 28a, are disposed between the previously inserted tabs 17a and the respective side wall panels 14 and 15.

In order to replenish the bait or remove the entrapped animal from compartment A, only cover section 16 need be opened to the position shown in FIG. 6. The remainder of the set-up box remains undisturbed.

Thus, it will be seen that a folding box has been provided which is of simple, yet inexpensive, construction and functions effectively as a bait trap for small animals. Furthermore, the improved box is readily capable of being unfolded for storage or transporting and then erected at the time and place it is to be used.

While an embodiment of this invention has been described above, further modifications may be made thereto and it is contemplated, therefore, by the appended claims, to cover any such modifications as fall within the true spirit and scope of this invention.

I claim:

1. A bait box formed of foldable sheet material, comprising a bottom panel, wall panels delimiting and being foldably connected to said bottom panel and extending upwardly therefrom, at least one of said wall panels being provided with an opening for access to the box interior, a sectional cover having a pair of sections foldably connected to a pair of wall panels, and an apertured partition panel foldably connected to one of said cover sections and disposed within the box interior and having a peripheral portion of said partition panel interlockingly engaging said bottom panel, said partition panel cooperating with said wall panels to form said box interior into a pair of interconnected compartments, the access opening formed in said one wall panel communicating with one of said compartments, the other cover section, when in closed position, overlapping and interlockingly engaging said one cover section.

2. A bait box construction formed of foldable sheet material, comprising a bottom panel, wall panels delimiting and being foldably connected to said bottom panel and extending upwardly therefrom, a sectional cover having a pair of sections foldably connected to a pair of opposing wall panels, and an apertured partition panel foldably connected to one of said cover sections and disposed within said box interior when said one cover section is in a closed position, said partition panel having a peripheral portion thereof in interlocking engagement with said bottom panel, said partition panel forming said box interior into a pair of interconnected compartments, said one cover section overlying one of said compartments, and one of said wall panels being provided with an opening for providing access to said one compartment, the other cover section when in a closed position, overlying the other compartment and overlapping and interlockingly engaging said one cover section.

3. A bait box construction formed of foldable sheet material, comprising a bottom panel, pairs of wall panels delimiting and being foldably connected to said bottom panel and extending upwardly therefrom, one pair of wall panels being provided with end flaps which are in interlocking engagement with a second pair of wall panels, and a sectional cover having a pair of sections foldably connected to said second pair of wall panels, each cover section being in interlocking engagement with said wall panel end flaps; said cover sections, when in closed positions, having portions thereof in overlapping engagement, the overlapping cover sections having peripheral portions thereof in interlocking engagement with said one pair of wall panels, one of said wall panels being provided with an opening for access to the interior of said box.

4. The bait box construction recited in claim 3 wherein the cover sections and said second pair of wall panels are provided with elongated slits for interlockingly accommodating portions of said end flaps; each slit intersecting the foldline connection between a cover section and the wall panel to which said cover section is connected.

5. The bait box construction recited in claim 4 including an apertured partition panel foldably connected to the overlapped cover section portion and disposed within said box interior and forming same into two compartments interconnected by an aperture in said partition panel, said partition panel being in interlocking engagement with said bottom panel.

6. The bait box construction recited in claim 5 wherein said one pair of wall panels includes foldable extension flaps, the latter being folded into underlying relation with respect to said cover sections when the latter are in closed positions.

7. The bait box construction recited in claim 6 wherein said partition panel includes side flaps engageable with the compartment-forming surfaces of said one pair of wall panels; said partition panel side flaps being disposed beneath said wall panel extension flaps when the latter are folded into underlying relation with respect to the closed cover sections.

8. A blank of foldable sheet material for use in forming a bait box, said blank comprising a bottom-forming first panel, a pair of end-forming second panels foldably connected to opposite peripheral portions of said first panel, a pair of side-forming third panels foldably connected to opposite peripheral portions of said first panel intermediate the peripheral portions thereof to which said second panels are connected, a first cover panel connected to one of said second panels by a foldline substantially parallel to the foldline connection between said one second panel and said first panel, a first pair of elongated slits intersecting said foldline, a second cover panel connected to the other of said second panels by a foldline substantially parallel to the foldline connection between the other second panel and said first panel, a second pair of elongated slits intersecting the foldline between said other second panel and said first panel, each third panel having flaps foldably connected to opposite peripheral portions thereof, and each third panel flap having a tab foldably connected thereto, each third panel flap and tab connected thereto interlockingly engaging a slit when said blank is set up to form said bait box.

9. The blank recited in claim 8 including an apertured partition panel connected to one of said cover panels by a foldline disposed in spaced substantially parallel relation with respect to the foldline connection between said cover panel and the second panel to which said cover panel is connected.

10. The blank recited in claim 9 including extension flaps connected to said third panels by foldlines disposed in spaced substantially parallel relation with respect to the connections between said third and first panels.

11. The blank recited in claim 10 wherein at least one of said third panels is provided with an opening for access to the interior of the box when the blank is set up to form same.

12. A blank of foldable sheet material for use in forming a bait box, said blank comprising a bottom-forming first panel; a pair of end-forming second panels connected by first foldlines to opposite peripheral portions of said first panel; a pair of side-forming third panels connected by second foldlines to opposite peripheral portions of said first panel intermediate the peripheral portions thereof to which said second panels are connected; top-closure flaps connected by third foldlines to outer peripheral portions of said third panels, said third foldlines being substantially parallel to said second foldlines, each third foldline being provided with an elongated slot; a pair of end-closure flaps connected by fourth foldlines to opposite peripheral positions of each third panel, said fourth foldlines being disposed transversely with respect to said second and third foldlines, each end-closure flap having a tab foldably connected thereto; a first cover panel connected by a fifth foldline to the outer periphery of one of the second panels, said fifth foldline being substantially parallel to said first foldlines and being provided with a pair of slits intersecting said fifth foldline, said first cover panel being provided with a pair of foldable locking tabs, said locking tabs when folded relative to the plane of said cover panel being disposed in interlocking engagement with said third foldline slots, when said blank is set up to form said box and said cover panel is in a closed position; and a second cover panel connected by a sixth foldline to the outer periphery of the other of said second panels, said sixth foldline being parallel to said first foldlines and being provided with a pair of slits intersecting said sixth foldline, said second cover panel being provided with a pair of foldable locking tabs adapted to interlockingly engage said third foldline slots, when said tabs are folded relative to the second cover panel, said blank is set up to form said box, and said second cover panel is in a closed position; the end-closure flaps and the tabs foldably connected thereto being in interlocking engagement with the pairs of transverse slits intersecting said fifth and sixth foldlines.

13. The blank recited in claim 12 including a partition panel connected by a seventh foldline to the outer periphery of said first cover panel, said seventh and fifth foldlines being in parallel relation; the periphery of said partition panel being provided with foldable flaps for engaging the interior surfaces of said first and third panels when said blank is set up to form said box.

14. The blank recited in claim 12 wherein the dimension of said second cover panel taken normal to the foldline connection thereof to said end-forming panel is greater than the corresponding dimension of said first cover panel whereby said second cover panel partially overlaps said first cover panel when said cover panels are in closed positions.

15. The blank recited in claim 14 wherein the locking tabs formed on said second cover panel are disposed in side by side engagement with the corresponding locking tabs formed on said first cover panel when said tabs are disposed within said third foldline slots.

16. The blank recited in claim 13 wherein each of said top-closure flaps foldably connected to said third panels comprises elongated sections arranged in endwise relation and connected to one of said third panels by one of said third foldlines; a corresponding one of said top-closure flap sections being provided with said third foldline slot.

References Cited

UNITED STATES PATENTS

| | | | |
|---|---|---|---|
| 1,135,588 | 4/1915 | Kendrick | 229—45 |
| 2,511,550 | 6/1950 | Simms | 229—6 |
| 2,964,871 | 12/1960 | Hoffman | 43—131 |
| 3,015,184 | 1/1962 | Scott et al. | 43—131 |
| 3,025,630 | 3/1962 | Silvey | 43—131 |
| 3,045,387 | 7/1962 | Simpson | 43—131 |
| 3,130,891 | 4/1964 | Wieke | 229—16 |
| 3,269,052 | 8/1966 | Barnhart | 43—131 |
| 3,298,128 | 1/1967 | Dill et al. | 43—131 |

ALDRICH F. MEDBERY, *Primary Examiner.*